United States Patent [19]

Cantor et al.

[11] Patent Number: 5,703,138
[45] Date of Patent: Dec. 30, 1997

[54] OXYGEN-CURABLE COATING COMPOSITION

[75] Inventors: Stephen E. Cantor, Cheshire; Leon Levine, West Hartford, both of Conn.

[73] Assignee: Dymax Corporation, Torrington, Conn.

[21] Appl. No.: 685,492

[22] Filed: Jul. 24, 1996

Related U.S. Application Data

[63] Continuation-in-part of Ser. No. 437,842, May 9, 1995, abandoned, which is a continuation-in-part of Ser. No. 328,965, Oct. 24, 1994, abandoned, which is a continuation of Ser. No. 180,370, Jan. 12, 1994, abandoned.

[51] Int. Cl.$^6$ .................... C08F 2/46; B05D 5/12; B32B 7/02
[52] U.S. Cl. .................... 522/29; 427/517; 427/96; 428/219; 428/461; 428/483; 525/245; 525/281
[58] Field of Search .................... 522/29; 427/517, 427/96; 428/219, 461, 483; 525/245, 281

[56] References Cited

U.S. PATENT DOCUMENTS

| | | |
|---|---|---|
| 2,414,089 | 1/1947 | Bruson . |
| 4,346,027 | 8/1982 | Van Eenam . |
| 4,451,523 | 5/1984 | Nativi et al. . |
| 4,590,101 | 5/1986 | Knapczyk . |
| 4,670,308 | 6/1987 | Knapczyk . |
| 5,165,127 | 11/1992 | Boeckeler . |
| 5,256,446 | 10/1993 | Bogen . |
| 5,288,523 | 2/1994 | Klaiber et al. . |

OTHER PUBLICATIONS

Santolink Products, Santolink XI-100 Crosslinker, Iniator, Sep. 1989.

*Primary Examiner*—Mark Chapman
*Attorney, Agent, or Firm*—Ira S. Dorman

[57] ABSTRACT

An acrylate composition, especially useful for producing conformal coatings on circuit board assemblies, includes a photoinitiator and an air-curing system, the latter being comprised of a compound having multiple allyloxy groups in its molecule and a transition metal salt catalyst. The composition is highly stable against auto-induced reaction in the absence of oxygen and at room temperature; it contains no active oxygen catalyst and no nonreactive diluent, and is advantageously formulated as a one-part product.

19 Claims, No Drawings

OXYGEN-CURABLE COATING COMPOSITION

CROSS-REFERENCE TO RELATED APPLICATIONS

This application is a continuation in part of application Ser. No. 08/437,842, filed May 9, 1995, now abandoned, which was in turn a continuation in part of application Ser. No. 08/328,965, filed Oct. 24, 1994, now abandoned, which was in turn a continuation of application Ser. No. 08/180, 370, filed Jan. 12, 1994 and now abandoned.

BACKGROUND OF THE INVENTION

Conformal coatings are commonly applied to printed circuit boards and electronic components to provide protection against chemical attack, moisture, air-borne contaminants, and the like, as well as against mechanical shock and vibration encountered in shipping and use.

First-generation conformal coatings, based upon acrylic, epoxy, silicone, and polyurethane chemistries, are often found disadvantageous from any of several standpoints; for example, application may be difficult, pot-life or processing speed may be inadequate, curing may require stringent or extreme conditions, they are typically solvent based and reaction may be accompanied by off-gassing of volatile organic compounds, etc.

The commercialization of conformal coatings that cure by actinic radiation (normally, ultraviolet light) has obviated many of the foregoing disadvantages. Such products are usually solventless, one-part systems that cure rapidly to a tack-free surface and that afford superior adhesion and good chemical, moisture and abrasion resistance.

As conventionally formulated, however, polymerization of photoinitiated compositions occurs only in those regions that have been subjected to the activating radiation, with secondary cure mechanisms being required to effect polymerization in unirradiated "shadow" areas. One secondary cure mechanism commonly utilized relies upon the addition of a heat-activated peroxide to the formulation; temperatures in excess of 100° Centigrade are however normally required to initiate peroxide-induced polymerizations, thus precluding use where, for example, heat-sensitive electronic components are involved. Solvent-based and two-part shadow-cure products have been proposed, but the former are of course inherently undesirable and the latter require mixing and afford only a limited pot-life; moisture-reactive free isocyanates have been used to provide shadow-cure properties as well, but health and environmental concerns have limited their acceptance.

Finally there is a class of products available that employ an oxygen-sensitive monomer and a metal drier to generate a peroxide in situ, for initiation of the secondary reaction. Such available products are however relatively slow to react, typically requiring many days to fully cure as, for example, a three-mil coating, and virtually precluding use in thickness of ten mils or more, as a practical matter. In general, moreover, the dual-curing products provided heretofore have tended to produce substantially different cross-link densities from area to area, depending upon the conditions of initiation and curing; also, the rate of reaction in unexposed regions will normally vary in substantially direct proportion to thickness of the deposit (as would be expected).

U.S. Pat. No. 2,414,089, to Bruson, provides allylic ester compounds suitable for use as coating materials in combination with metallic driers.

VanEenam U.S. Pat. No. 4,346,027 describes a composition that confers an enhanced balance of wet and dry strength properties to a cellulose substrate; the composition includes a polyether-ene polymer and a transition metal drier salt. The patent is not concerned with acrylic monomer-based photoinitiated coating compositions.

U.S. Pat. No. 4,451,523, to Nativi et al, discloses a one-component, UV-curable acrylate conformal coating system in which a (meth)acrylate reactive diluent having at least one allylic reactive bond, and a metal drier, provide a secondary cure mechanism.

U.S. Pat. No. 5,164,127, to Boeckeler, provides a method for preparing scratch-resistant coatings on gel-coated composite materials, wherein a mold is initially coated with a composition comprising a polyfunctional monomer having three or more acrylyloxy groups (e.g., Monsanto Corporation's SANTOLINK IX-100); the coating composition also includes a polyfunctional acrylate monomer, a copromoter, a stabilizer against oxygen reactivity, and a UV-responsive photoinitiator. After partial curing, the coating composition is covered with a gel composition, to which is in turn applied a fiber-reinforced molding resin.

U.S. Pat. No. 5,256,446, to Bogen, provides a radiation-curable metallization primer comprised of an acrylate copolymer, a monomer or oligomer containing three acryloyl groups, a polyether-ene aliphatic oligomer, and a photoinitiator.

The manufacturer's product bulletin for SANTOLINK XI-100 describes a polyunsaturated aliphatic liquid oligomer containing 20 allyloxy hydrogens in the molecule, and describes transition metal-catalyzed reactions of formulations containing the same, and applications therefor; solvent, heat, or a peroxide catalyst is relied upon to effect curing.

SUMMARY OF THE INVENTION

It is a broad object of the present invention to provide a novel liquid composition that is capable of photoinitiation (normally by UV light), and of rapid curing in air and at room temperature, to produce an adherent solid coating that has outstanding physical and chemical properties.

Related objects of the invention are to provide a novel article of manufacture comprised of a substrate having such a coating thereon, and to provide a novel method for the production of such an article.

More specific objects are to provide a composition having the foregoing features and advantages, which composition attains a substantially uniform cross-link density irrespective of whether or not it is subjected to radiation, exhibits a cure rate that is quite independent of film thickness, is free from inert solvents, contains minimal levels of volatile organic compounds, is nontoxic, and can be formulated as a single part to remain stable against auto-induced reaction for an extended period of time.

Other specific objects are to provide a novel article comprised of a circuit board assembly having a conformal coating thereon that is at least two mils thick, and a novel method for the production thereof.

It has now been found that certain of the foregoing and related objects of the invention are attained by the provision of a composition comprising, on a weight basis, 15 to 60 parts of a free-radical reactive (meth)acrylate monomer; 5 to 25 parts of an air-curing polyether-ene polymer containing at least three activated double bonds in the molecule; a catalytic amount of a photoinitiator, and a catalytic amount of a dissolved transition metal ion. The acrylate monomer ingredient is constituted of less than about 20 weight percent polyfunctional molecules (i.e., acrylate and/or methacrylate monomers containing three or more acrylate functionalities), and the composition is free from acrylated carbonate polymers, added active oxygen catalytic compounds, oxygen-reaction inhibitors, and inert solvents; it may optionally contain 5 to 40 parts of certain other reactive oligomers.

In preferred embodiments the polyether-ene polymer will be an allyloxy compound, especially one containing at least ten allyloxy groups in the molecule; most desirably, the composition will comprise 10 to 20 parts of such an allyloxy compound. The transition metal will normally be selected from the group consisting of cobalt, manganese, vanadium, and cerium, and the composition will advantageously be formulated as a single part, remaining substantially stable (in the absence of oxygen) against auto-induced reaction. The composition may further include 1 to 10 parts of a reactive diluent selected from the class consisting of vinyl ethers, epoxides, and vinyl amides, and will desirably include 1 to 10 parts of acrylic acid. In those instances in which the composition includes a reactive epoxide and/or a vinyl ether ingredient, as well as an acrylate monomer, a cationic initiator (active or latent) may be incorporated to enable curing to be effected by that mechanism as well.

Other objects of the invention are attained by the provision of an article of manufacture comprising a substrate and a cured coating thereon. The coating is produced from the composition hereinabove described, and is at least two mils in thickness. Most advantageously, the substrate will be a circuit board assembly.

Additional objects are attained by the provision of a method for producing such an article of manufacture, wherein a coating composition, as hereinabove described, is deposited upon a substrate and curing of the composition is effected, normally and preferably at room temperature, following exposure of the coated substrate to radiation to activate the photoinitiator. The method will preferably be employed to produce a conformal coating that is at least about two mils in thickness.

DETAILED DESCRIPTION OF THE PREFERRED EMBODIMENTS

Exemplary of the efficacy of the present invention are the following specific examples, wherein amounts expressed are in parts by weight, unless indicated otherwise, and wherein all reactions are effected at room temperature. The IRGACURE products referred to are commercially available from Ciba-Geigy Chemical Corporation and are defined below; cobalt octoate is employed as an eight percent solution, except where indicated otherwise; and SANTOLINK XI-100 is commercially available from Monsanto Chemical Company and is a polyallyloxy polyol containing twenty allyloxy hydrogens in its molecule, and having the structural formula:

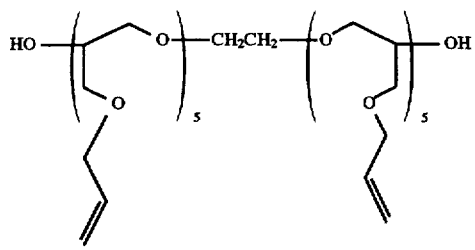

EXAMPLE ONE

A formulation is prepared by mixing the following ingredients in the amounts set forth in parenthesis: tetrahydrofurfural acrylate (10), isobornyl acrylate (36), aliphatic polyester urethane oligomer of about 200 molecular weight (26), acrylic acid (5), SANTOLINK XI-100 (13), triethylene glycol divinyl ether (5), IRGACURE 184 (4), and cobalt octoate (0.3). The formulation is coated upon the surface of an FR-4 circuit board substrate as a two-mil layer, and a portion of its surface is shaded by a metal tent. Following exposure of the coated board to UV light, the irradiated areas cure quickly to a smooth, dry-to-the touch coating; the areas in the shadow remain wet. After about 24 hours at room temperature and exposed to air, the unirradiated area gels and skins over; it becomes very dry and fully cured after about 48 hours under the same conditions.

EXAMPLE TWO

Three formulations, A, B, and C, embodying the present invention are prepared by admixing the ingredients set forth in the following table, in the amounts specified; the acrylate oligomer referred to is a polyethylene glycol polyurethane of about 2000 molecular weight, the free isocyanate groups of which are end-capped with 2-hydroxyethyl(meth)acrylate:

TABLE ONE

| | Formulation Designation | | |
| Ingredient | A | B | C |
| --- | --- | --- | --- |
| octyl/decyl mixed acrylate | 12.30 | 26.56 | — |
| isobornyl acrylate | 15.48 | 7.21 | 39.34 |
| acrylate oligomer | 36.00 | 31.60 | 34.10 |
| triphenyl phosphate | 8.04 | 11.24 | — |
| acrylic acid | 2.88 | 3.01 | 3.70 |
| IRGACURE 184 | 2.28 | 1.38 | 2.31 |
| IRGACURE 651 | 2.88 | 1.38 | 2.90 |
| SANTOLINK XI-100 | 14.96 | 13.00 | 12.50 |
| cobalt octoate | 0.30 | 0.20 | 0.33 |
| triethylene glycol divinyl ether | 4.86 | 4.00 | 4.80 |

Each formulation is applied as a uniform layer to the surface of an FR-4 substrate. Except under a central area that is blocked by a metal tent, the boards are exposed for 30 seconds to 365 nm ultraviolet radiation from a lamp rated at 250 milli-watts/cm$^2$, to effect curing. The exposed area of each sample cures rapidly to a tough, non-tacky coating, while the material in the shadow area remains wet. In all instances, however, maintaining the sample in air produces a dry coating of good quality within a period of approximately 72 hours.

In the fully cured condition, formulation A exhibits a Durometer "A" value of 78, a tensile strength at break of 430 psi, an elongation at break of 45 percent, and a water absorption of 2 percent; formulation C exhibits a Durometer "D" of 80, a tensile strength at break of 339 psi, an elongation at break of 7 percent, and a water absorption of 2 percent; no comparable evaluation of the formulation B product is made.

Pencil hardness tests (ASTM Method D 3363-74) are also carried out in connection with formulations A and C, in both the UV-irradiated and also the shadow areas of the coated boards (the air-cured, non-irradiated areas are given a three- to four-day precure, so that meaningful data can be obtained). After two days, all areas (shaded and irradiated) of the boards coated with both formulations exhibit a pencil hardness value of "HB"; after six days, the UV and air-cured areas of the formulation A coating exhibit values of "B" and "F", respectively, whereas the corresponding areas of the formulation C coatings exhibit values of "F" and "H", respectively.

As will be appreciated, it is very surprising to obtain pencil hardness values that are substantially the same irrespective of whether curing occurs by actinic radiation initiation or only by mere exposure to air; these data indicate that the cross-link densities do not vary significantly. Rub tests, effected using a piece of cheesecloth saturated with methyl ethyl ketone and carried on the end of a ball-peen hammer, further indicate the existence of similar cross-link densities as well as good solvent resistance.

Another very surprising property exhibited by formulations embodying the invention resides in the absence of a direct relationship between the rate of curing and the thickness of the deposit; i.e. the cure rate is much more constant than could have been predicted. This is a highly beneficial characteristic, especially from the standpoint of facilitating control upon manufacturing operations in which the thickness of the deposit produced may (or will necessarily) vary; the property is illustrated by the following:

Deposits of formulations A and C are produced in thicknesses of 2, 3, 5, 7 and 9 mils. Air curing of the three thin-nest coatings occurs in a period of about 72 to 80 hours; curing of the 7- and 9-mil coatings occurs in periods of 72 to 85 and 75 to 85 hours, respectively. The phenomenon is found to persist, moreover, in deposits of much greater thickness. Using formulation C, 20-, 50- and 100-mil films are produced and are allowed to remain exposed to air until they become hard and tough. That result is achieved in the 20- and 50-mil films in a period of about 96 hours, and in the 100-mil film in about 128 hours. It should be noted that conformal coatings are desirably produced in a minimum thickness of five mils (plus or minus two mils), with no upper limit.

EXAMPLE THREE

A series of formulations embodying the present invention are prepared, and contain the ingredients in the amounts listed in Table Two, which follows:

TABLE TWO

| Ingredient | Formulation Designation | | | |
|---|---|---|---|---|
| | D | E | F | G |
| UVR-6110 | 50.0 | 20.0 | 35.0 | — |
| UVI-6974 | 5.0 | 5.0 | 5.0 | 5.0 |
| SANTOLINK XI-100 | 15.0 | 15.0 | 7.5 | 15.0 |
| isobornyl acrylate | 30.0 | 60.0 | 30.0 | 25.0 |
| triethylene glycol divinyl ether | — | — | 22.5 | 60.0 |
| cobalt octoate | 0.3 | 0.3 | 0.3 | 0.3 |

The products referred to as UVR-6110 and UVI-6974 are commercially available from Union Carbide Corporation; the first is a diepoxide, and the second is a mixed aryl sulfonium salt cationic photoinitiator sold under the name CYRACURE.

A portion of each formulation is applied to the surface of an FR-4 board as a three-mil coating, with a second portion being maintained in a 25 ml plastic container fitted with a cardboard top to allow some air flow. The photoinitiator is found to be effective for UV-curing, and not to poison the air-cure mechanism; but only when the formulation contains at least about 20 percent of an acrylate monomer is air curing found to occur at a practical rate (i.e., reaction is complete within a period of three to five days). Thus, formulations embodying the invention, and containing vinyl ethers or epoxides, air-cure in the presence of cationic initiators as long as a substantial amount of acrylate monomer is included as well.

Comparative Example One

A formulation comparable to formulation "C" of Example Two is prepared and tested as described therein, but about 4 parts of a diallyl ether is used in place of the allyloxy polyol. The area exposed to UV radiation cures rapidly to a tough, non-tacky coating. In the unexposed area the material remains wet for a period of more than one month, after which the test is discontinued.

Comparative Example Two

Part A

A product commercially available under the trade designation Loctite 378 is applied to the surface of an FR-4 board, and is found to require in excess of ten days for achieving cure in air; the material also has a strong odor. In addition, the rate of air cure of the material is found to be dependent to a high degree upon the thickness of the deposit; indeed, curing occurs even more slowly at increased thicknesses than would be predicted based upon an assumption that the rate would vary in direct proportion to thickness. The product is believed to contain the following ingredients, in the percentages set forth in parentheses: dicyclopentenyloxyethyl methacrylate (45–50), acrylated epoxy (30–35), acrylate ester (5–10), acrylic acid (5–10), photoinitiator (3–5), substituted silane (1–3) and cobalt naphthenate (0.1–1).

The addition of 15 to 20 parts of SANTOLINK XI-100 to the Loctite 378 product increases the rate of UV-cure, but produces films having a "cheesy" character. The formulation exhibits poor stability against reaction in a closed container, and when exposed to air gelling occurs in approximately ten minutes, even when as little as 5 parts of the SANTOLINK product is added; such a material is of course virtually useless, as a practical matter.

Comparative Example Three

The coating composition described in Example 1 (column 9) of Bogen U.S. Pat. No. 5,256,446 is prepared and tested, along with a variant thereof in which 0.36 percent (based upon the weight of the coating composition) of a 12 percent cobalt naphthenate solution is added. Parallel tests are run using the formulation of part "C" of Example Two hereof, and using variants thereof in which: (1) the cobalt compound is omitted, and (2) the formulation, as described, is diluted to a 50 percent solution in butyl acetate.

The foregoing compositions and formulations are tested in general accord with Example Two, and in all instances exposing them to the dose of UV radiation specified therein quickly effects curing to a pencil hardness value of 5 H to 6 H.

Unexposed deposits of the same materials are held in darkness, at ambient temperature, until curing occurs. The cobalt-containing formulations based upon Example Two "C" both cure to a pencil hardness value of 3 H within four days' time. The cobalt-containing composition based upon Bogen Example 1 requires 34 days' time to cure in darkness, whereupon the coating exhibits a pencil hardness of 4 H. There is no curing of either of the two materials from which cobalt was omitted.

The cobalt-containing composition that is based upon the Bogen example is reformulated to contain 19 (rather than 9) weight percent of the polyethylenically unsaturated aliphatic oligomer specified. It is left unexposed to UV radiation, and is held in darkness at ambient temperature until reaction occurs. After 20 days' time the composition exhibits no sign of curing. After 25 days, however, it has produced a coating with a 6 H pencil hardness value.

Comparative Example Four

Part A

A formulation (A) was prepared following Example 1 (column 4) of Boeckeler U.S. Pat. No. 5,164,127. A second, similar formulation (B) was prepared in which a mixture of isobornyl acrylate, hydroxyethyl methacrylate, acrylic acid and a silane compound (in an 80/20/5/1 weight proportion, respectively) was substituted for the SR-399 ingredient. These formulations, and formulation "C" of Example Two, were applied separately, and in various combinations, as uniform coatings on FR-4 boards. The resulting samples were subjected to various curing conditions; i.e., some were cured by exposure to UV radiation under the conditions described in Example Two (but no tent was used); others, after having been so cured, were subjected to thermal cycling at temperatures of −40° C. to +100° C.; and still others were permitted to cure under ambient conditions (i.e., to air-cure at room temperature). Each of the UV-cured samples was subjected to a standard cross hatch tape-adhesion test (ASTM Method D 3359).

The compositions of the coatings, and the results of the adhesion tests, are set forth in Table Three, which follows. The numbers associated with the letter designations define the weight percentages of each constituent contained in the coating composition, and adhesion is expressed on a 0 to 5 scale, ranging from complete pull-off (i.e., no adhesion) to no pull-off (i.e., complete adhesion); the data in the second column were obtained using the thermally cycled samples:

TABLE THREE

| Composition | Adhesion | |
| --- | --- | --- |
| 100A | 0 | 0 |
| 75A/25B | 0 | 0 |
| 50A/50B | 4 | 2 |
| 25A/75B | 4 | 4 |
| 100B | 4 | 4 |
| 75A/25C | 0 | 0 |
| 50A/50C | 0 | 0 |
| 25A/75C | 0 | 0 |
| 100C | 4 | 4 |

With the exception of the 75 A/25 C mixture and the 100 C coating, drying failed to occur in the air-curing tests after four days and each coating remained as a wet, flammable liquid. Although not in liquid form, the 75 A/25 C mixture failed to dry to the touch after four days. The 100 C coating was, on the other hand, fully dry to the touch after exposure for a single day in air.

It is to be noted, with regard to the foregoing test results, that to be satisfactory for use as a conformal coating, for example, the composition must not only dry in a commercially reasonable time but it must also maintain adhesion through thermal cycling. It is also to be appreciated that, although the 25 A/75 B and 100 B formulations exhibited good adhesion, they fail to provide the air-drying properties that are essential to compositions embodying the instant invention.

Part B

Additional formulations were prepared following Example 1 of the Boeckeler patent by admixing 40 parts of SR-399, 9.5 parts of SANTOLINK XI-100, and 0.5 part of IRGACURE 651, with and without 0.05 part of methyl ethyl ketoxime. Irrespective of whether or not the ketoxime was added (as is taught in the Boeckeler example), the composition (applied to a FR-4 board) failed to dry in air after 48 hours. The addition of 0.2 part of a 12% cobalt octoate solution to the ketoxime-free mixture caused air-drying to take place in one day, whereas air-drying of the ketoxime-containing mixture was caused to occur in 36 to 48 hours by addition of the cobalt compound; the latter result is attributable to the eventual evaporation of the oxygen reaction-inhibiting ketoxime compound. In all instances the formulations cured to the dry state after UV irradiation, thus demonstrating that the metal drier and/or the oxygen-reaction inhibitor has no significant affect upon UV-initiated reactions.

A key ingredient of the instant composition is of course the air-curing polyether-ene polymer, a full description of which is provided under the heading "THE AIR-CURING POLYMER COMPONENT," set forth in columns 3 through 8 of VanEenam U.S. Pat. No. 4,347,027, which description is hereby incorporated hereinto by reference thereto. Suffice to say that the air-curing polymers suitable for use as the polyether-ene polymer ingredient has a backbone comprising at least one segment having the formula:

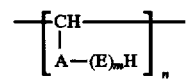

wherein A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation, either $\alpha,\beta$ or $\beta,\gamma$ to the activating group, n is the number of adjacent (as the term is hereinafter defined) segments having this formula, and n and m are integers and are each at least 1, provided that where one is less than 4 the other is at least 4.

The polyether-enes can have a plurality of adjacent segments of the above formula, by which term "adjacent" is meant that they are directly connected through a carbon—carbon bond or are indirectly connected through a

group or an oxygen or sulfur atom.

As pointed out in the VanEenam patent, the effectiveness of the polyether-enes depends to a large extent on the provision of a plurality of activated double bonds in blocks which are spatially closely related. These double bonds are sites at which oxygen-initiated crosslinking takes place during the drying or accelerated or natural ageing operation. Thus, the provision of blocks of activated double bonds, each of which can provide a bond site, increases the potential crosslink density as well as the structural strength of the crosslinks that form inter- and intra-molecularly during drying and/or ageing. In accordance with the instant invention, the polyether-ene molecule will include at least three activated double bonds.

By virtue of their proximity in the polymer molecule to other strongly electron-donating groups, the double bonds are activated; i.e., they are more ready to form crosslinks during the air drying process. Examples of such electron-donating groups include ether, sulfide, hydroxyl, carboxyl, and olefinically unsaturated groups. The preferred electron-donating group is an ether group.

As will be appreciated from the foregoing Examples, the preferred air curing polymer is the activated polyunsaturated aliphatic oligomer sold as SANTOLINK XI-100. It has the structural formula:

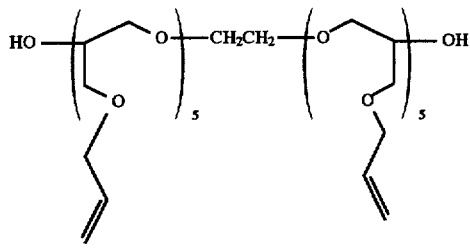

thus providing 20 allyloxy hydrogens per molecule.

Reactive acrylate monomers that are suitable for use in the instant formulations include of course both monofunctional, difunctional, and polyfunctional acrylates and methacrylates; as stated above, however, the amount of polyfunctional acrylate included will not exceed 20 weight percent of the acrylate monomer component, and in many instances polyfunctional acrylates will be excluded entirely. The acrylate monomers employed will generally be reaction products of acrylic acid and/or methacrylic acid with one or more mono-, di- or poly-basic, substituted or unsubstituted, alkyl ($C_1$ to $C_{18}$), aryl or aralkyl alcohols. Acrylates in which the alcohol moiety contains a polar substituent (e.g., an hydroxyl, amine, halogen, cyano, heterocyclic or cyclohexyl group) will often be preferred because crosslinking, or other intermolecular bonding, is promoted thereby. Suitable such monomers and prepolymers are well known in the art, and are in part disclosed for example at line 53, column 6, through line 35, column 7 of Bachmann et al U.S. Pat. No. 4,429,088, and at line 14, column 4 through line 52, column 5 of U.S. Pat. No. 4,451,523. Nevertheless, it might be noted that the following acrylates and corresponding methacrylates (the methacrylate compounds being preferred in many instances) are especially suitable for use in the present compositions, alone or in combination with one another: hydroxyethylacrylate, isobornyl acrylate, tetrahydrofurfuryl acrylate, diethyleneglycol diacrylate, 1,4-butanediol diacrylate, butylene glycol diacrylate, neopentyl glycol diacrylate, octylacrylate and decylacrylate (normally in admixture), polyethyleneglycol diacrylate, trimethylcyclohexyl acrylate, benzyl acrylate, butyleneglycol diacrylate, polybutyleneglycol diacrylate, and tripropyleneglycol diacrylate; trimethylolpropane triacrylate, di-trimethylolpropane tetraacrylate, pentaerythritol tetraacrylate, and di-pentaerythritol pentaacrylate may for example be employed in minor amounts in admixture with the mono- and/or di-acrylate monomers. If used in an amount greater than about 20 percent by weight of the acrylate monomer component, polyacrylates will lead to compositions that are unduly viscous for many applications, and that exhibit unsatisfactory cure properties. These features will generally vary in proportion to the number of acrylate groups present in the monomer molecule; consequently, the greater the acrylate functionality of any acrylate monomer the lesser the amount of it that will usually be employed. In any event, the addition of about 1 to 10 weight percent of acrylic acid to the instant compositions will generally be beneficial, to increase adhesion.

A free-radical reactive oligomer will normally be included in the composition (alone or, where appropriate, in combination with a cationic-reactive oligomer), but it should be appreciated that such a product is not necessary to the attainment of the cure properties desired herein. Oligomers suitable for use comprise vinyl polymers, acrylic polymers, polyester elastomers, glycol polymers, acrylated epoxies, natural and synthetic rubbers, polyester acrylates, epoxy acrylates, polyether acrylates, alkyd acrylates, polyol acrylates, and the like. However, the use of the urethane polymers and prepolymers will often be found most beneficial, with the latter being especially desirable due to the potential that they afford for further reaction of their pendant isocyanate groups with a reactive functionality (e.g., an hydroxyl group) provided by a suitable acrylate monomer. Diisocyanate-capped polyethers and polyesters, acrylated by reaction with hydroxyethyl acrylate or hydroxyethyl methacrylate and having a molecular weight of about 400 to 6,000, are particularly preferred.

Vinyl ether reactive diluents used herein will usually conform to the structural formula:

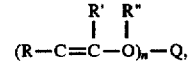

in which formula each of the substituents R, R' and R" independently represents an hydrogen atom, an aliphatic group, or an aromatic group; n is an integer, usually having a value from 1 to 6; and Q represents an aliphatic group, an aromatic group, an alkoxy group, a cycloaliphatic group, an ester group, a polyester group, an ether group, a polyether group, a carbamide group, a carbamate group, an heterocyclic group, or the like, each of such groups optionally being further substituted by an hydroxyl or a vinyl group, or both. Vinyl ether-terminated ester monomers and vinyl ether-terminated aromatic urethane oligomers may find utility herein, and it is believed that analogous compounds in which a sulfur atom replaces the oxygen of the ether group(s) may be used as well (alone or in combination) as a diluent ingredient.

Suitable specific vinyl ether compounds include the following: triethylene glycol divinyl ether, 1,4-cyclohexane dimethanol divinyl ether, propenyl ether of propylene carbonate, n-dodecyl vinyl ether, hydroxybutyl vinyl ether, cyclohexyl vinyl ether, and tetrahydrofurfuryl vinyl ether. Exemplary epoxy compounds that may be employed include 3,4-epoxycyclohexylmethyl-3,4-epoxy-cyclohexanecarboxylate, bis-(3,4-epoxycyclohexyl)adipate, diglycidyl ether of bisphenol A, and epoxidized soybean oil. Among the amide compounds that are believed to be suitable are included divinyl urea and the n-vinyl derivatives of formamide, caprolactam, pyrrolidone, and phthalimide.

Although suitable photoinitiators will be apparent to those skilled in the art, specific illustrative compounds that might be identified are dimethoxy-2-phenylacetophenone (Ciba- Geigy IRGACURE 651), 1-hydroxycyclohexylphenyl ketone (Ciba-Geigy IRGACURE 184), and 2-hydroxy-2-methyl-1-phenylpropane-1-one (Ciba-Geigy DAROCUR 1173). A further listing may be obtained by reference to U.S. Pat. No. 4,820,744, particularly at line 43, column 4 through line 7, column 7. Cationic photoinitiators may also be employed, as indicated by the foregoing Example Three, to provide a further cure mechanism in appropriate circumstances.

Other materials may be incorporated into the instant compositions in addition to the components hereinabove described. For example, "inert" fillers such as wood flour, cornstarch, glass fibers, cotton linters, mica, alumina, silica, and the like, may be used to modify viscosity, improve impact resistance, and for other purposes, and it is conventional to include small percentages of silane coupling agents to increase moisture resistance as well as to enhance bond strength to glass and similar surfaces. Substances such as dyes, fluorescing agents, flame retarders, certain stabilizers, viscosity modifiers (thixotropes, thickeners, viscosity reducers), plasticizers, antioxidants, and the like, may be incorporated as well.

It is of course important that oxygen-reaction inhibitors be excluded from the instant compositions, to ensure that the air-curing reactions will occur therein efficiently and at practical rates. Thus, and as noted above, the present compositions will contain no complexing agents that prevent or retard reaction with molecular oxygen, such as, for example, EDTA and the ketoxime compound employed in the compositions disclosed in the above-cited Boeckeler patent.

Thus, it can be seen that the present invention provides a novel liquid composition that is capable of photoinitiation and rapid curing in air to produce an adherent solid coating that has outstanding physical and chemical properties. The invention also provides a novel article of manufacture comprised of a substrate having such a coating thereon, and a novel method for the production of such an article. A substantially uniform cross-link density can be produced in all cured areas, regardless of whether or not the area is subjected to radiation; the composition exhibits a cure rate that is quite independent of film thickness, it is free from inert solvents, it contains minimal levels of volatile organic solvents, and it can be formulated as a single part to remain stable against auto-induced reaction for an extended period of time. Conformal coatings that are at least two mils or more in thickness can readily be produced, and initial gelling and full cure are achieved in relatively short periods of time.

Having thus described the invention, what is claimed is:

1. A liquid coating composition comprising, on a weight basis, 15 to 60 parts of a free-radical reactive acrylate monomer constituted of less than about 20 weight percent polyfunctional molecules; 5 to 25 parts of an air-curing polyether-ene polymer containing at least three activated double bonds per molecule; a catalytic amount of photoinitiator; and a catalytic amount of a dissolved transition metal ion, said composition being free from acrylated carbonate polymers, added active oxygen catalytic compounds, oxygen-reaction inhibitors, and inert solvents.

2. The composition of claim 1 wherein said polyether-ene polymer is an allyloxy compound.

3. The composition of claim 2 wherein said allyloxy compound has the structural formula:

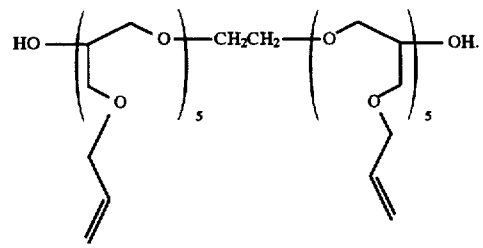

4. The composition of claim 2 wherein said allyloxy compound contains at least ten allyloxy groups in the molecule, and wherein said composition comprises 10 to 20 parts of said allyloxy compound.

5. The composition of claim 1 further including 5 to 40 parts of a reactive oligomer.

6. The composition of claim 1 wherein said transition metal ion is selected from the group consisting of cobalt, manganese, vanadium, and cerium.

7. The composition of claim 1 further including 1 to 10 parts of a reactive diluent selected from the class consisting of vinyl ethers, epoxides, and vinyl amides.

8. The composition of claim 1 formulated as a single part, said composition being substantially stable, in the absence of oxygen, against auto-induced reaction.

9. An article of manufacture comprising a substrate and a cured coating thereon, said coating being produced from a composition comprising, on a weight basis, 15 to 60 parts of a free-radical reactive acrylate monomer constituted of less than about 20 weight percent polyfunctional molecules; 5 to 25 parts of an air-curing polyether-ene polymer containing at least three activated double bonds per molecule; 5 to 40 parts of a reactive oligomer; a catalytic amount of photoinitiator; and a catalytic amount of a dissolved transition metal ion, said composition being free from acrylated carbonate polymers, added active oxygen catalytic compounds, oxygen-reaction inhibitors, and inert solvents; said coating being at least two mils in thickness.

10. The article of claim 9 wherein said polyether-ene polymer is an allyloxy compound.

11. The article of claim 10 wherein said allyloxy compound has the structural formula:

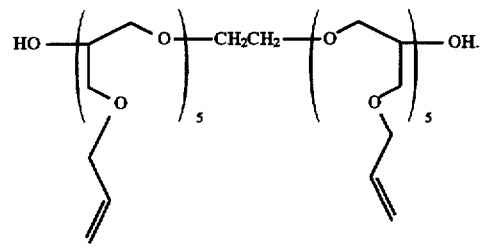

12. The article of claim 9 wherein said substrate is a circuit board assembly.

13. A method for producing an article of manufacture, including the steps: providing a substrate; depositing upon said substrate a coating composition comprising, on a weight basis, 15 to 60 parts of a free-radical reactive acrylate monomer constituted of less than about 20 weight percent polyfunctional molecules; 5 to 25 parts of an air-curing polyether-ene polymer containing at least three activated double bonds per molecule; a catalytic amount of photoinitiator; and a catalytic amount of a dissolved transition metal ion, said composition being free from acrylated carbonate polymers, added active oxygen catalytic compounds, oxygen-reaction inhibitors, and inert solvents; and exposing said substrate, as so coated, to radiation for activating said photoinitiator to initiate curing of said deposited composition.

14. The method of claim 13 wherein said polyether-ene polymer is an allyloxy compound.

15. The method of claim 14 wherein said allyloxy compound has the structural formula:

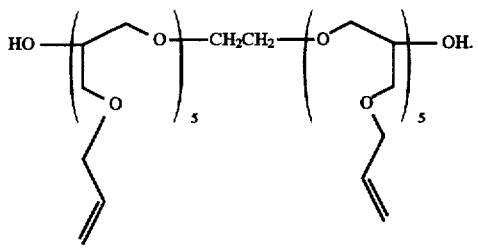

16. The method of claim 14 wherein said composition further includes 5 to 40 parts of a reactive oligomer.

17. The method of claim 13 wherein curing of said deposited composition is effected at room temperature.

18. The method of claim 13 wherein said coating is at least about two mils in thickness, and wherein curing thereof produces a conformal coating on said substrate.

19. The method of claim 13 wherein said substrate is a circuit board assembly.

* * * * *